United States Patent
Mu et al.

(10) Patent No.: US 9,594,451 B2
(45) Date of Patent: Mar. 14, 2017

(54) CAPACITIVE IN-CELL TOUCH SCREEN PANEL AND DISPLAY DEVICE HAVING CAPACITIVE IN-CELL TOUCH SCREEN PANEL

(71) Applicants: HEFEI BOE OPTOELECTRONICS TECHNOLOGY CO., LTD., Hefei, Anhui (CN); BOE TECHNOLOGY GROUP CO., LTD., Beijing (CN)

(72) Inventors: Suzhen Mu, Beijing (CN); Ming Hu, Beijing (CN)

(73) Assignees: HEFEI BOE OPTOELECTRONICS TECHNOLOGY CO., LTD., Hefei, Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 361 days.

(21) Appl. No.: 14/345,329

(22) PCT Filed: Jun. 9, 2013

(86) PCT No.: PCT/CN2013/077088
§ 371 (c)(1),
(2) Date: Mar. 17, 2014

(87) PCT Pub. No.: WO2014/139229
PCT Pub. Date: Sep. 18, 2014

(65) Prior Publication Data
US 2016/0154515 A1    Jun. 2, 2016

(30) Foreign Application Priority Data
Mar. 12, 2013   (CN) .......................... 2013 1 0078255

(51) Int. Cl.
*G06F 3/045*   (2006.01)
*G06F 3/041*   (2006.01)
(Continued)

(52) U.S. Cl.
CPC ............ *G06F 3/0416* (2013.01); *G06F 3/044* (2013.01); *G06F 3/047* (2013.01); *G06F 3/0412* (2013.01)

(58) Field of Classification Search
CPC ........................................................ G06F 3/044
(Continued)

(56) References Cited

U.S. PATENT DOCUMENTS

| | | | |
|---|---|---|---|
| 2003/0179324 A1* | 9/2003 | Yamazaki | G02F 1/1362 349/43 |
| 2013/0050130 A1* | 2/2013 | Brown | G06F 3/044 345/174 |
| 2014/0055685 A1* | 2/2014 | Wang | G06F 3/0412 349/12 |

FOREIGN PATENT DOCUMENTS

| | | |
|---|---|---|
| CN | 102750062 A | 10/2012 |
| CN | 102841716 A | 12/2012 |

OTHER PUBLICATIONS

Written Opinion of the International Searchong Authourity dated Dec. 12, 2013; PCT/CN2013/077088.

* cited by examiner

*Primary Examiner* — Jonathan Blancha
(74) *Attorney, Agent, or Firm* — Ladas & Parry LLP

(57) ABSTRACT

In a capacitive in-cell touch screen panel and a display device, touch driving signal lines are disposed between adjacent rows of pixel units in a TFT array substrate; at least one data signal lines in the TFT array substrate acts as a touch reading signal line as well; touch electrodes and touch switching units are disposed in regions defined at overlapping positions between the touch reading signal lines and the touch driving signal lines. The touch screen panel can be manufactured without adding a further process which saves production costs and improves production efficiency.

20 Claims, 4 Drawing Sheets

(51) Int. Cl.
*G06F 3/044* (2006.01)
*G06F 3/047* (2006.01)

(58) Field of Classification Search
USPC .......................................................... 345/174
See application file for complete search history.

US 9,594,451 B2

CAPACITIVE IN-CELL TOUCH SCREEN PANEL AND DISPLAY DEVICE HAVING CAPACITIVE IN-CELL TOUCH SCREEN PANEL

TECHNICAL FIELD

Embodiments of the present invention relate to a capacitive in-cell touch screen panel and a display device.

BACKGROUND

Demands for touch screen panels are increasing more and more with the fast development of small and portable electronic apparatuses. At present, depending on configuration structures, touch screen panels can be classified into add-on mode touch screen panels, on-cell touch screen panels and in-cell touch screen panels. For add-on mode touch screen panels, the touch screen panel and liquid crystal display (LCD) need to be produced separately and then attached together to form a liquid crystal display with touch function. Add-on mode touch screen panels suffer disadvantages of high manufacturing costs, low light transmission rate and great module thickness. For an in-cell touch screen panel, touch electrodes of the touch screen panel are embedded inside the liquid crystal display which can reduce the entire thickness of the module and further greatly lower manufacturing costs of touch screen panels, hence winning attraction of panel manufacturers.

At present, a capacitive in-cell touch screen panel is realized by directly adding touch driving signal lines and touch sensing signal lines on an existing TFT (thin film field effect transistor) array substrate, that is, two layers of strip-like ITO (indium tin oxide) electrodes that intersect with each other in different planes are manufactured on the surface of the TFT array substrate and act as touch driving signal lines and touch sensing signal lines respectively with inductive capacitors being formed at intersections of two ITO electrodes. The operation process of the touch screen panel is as follows: when touch driving signals are applied to ITO electrodes as touch driving signal lines, voltage signals inducted by the sensing signal lines through the inductive capacitor are detected, and during this period where a human body touches the touch screen panel, the body's electric field acts on the inductive capacitor to cause the capacitance value thereof to change and then change the voltage signals generated by coupling with touch sensing signal lines. It is possible to determine the location of touch depending on variation of voltage signals.

For the above-mentioned structure design of the capacitive in-cell touch screen panel, since touch driving signal lines and touch sensing signal lines are added, it is required to increase a new pattern structure layer for the existing TFT array substrate, which requires adding new processes for manufacturing a TFT array substrate, resulting in increased production costs and adverse effect on improvement of production efficiency.

SUMMARY

Embodiments of the present invention provide a capacitive in-cell touch screen panel and a display device for realizing a capacitive in-cell touch screen panel with low costs and high production efficiency.

One aspect of the present invention provides a capacitive in-cell touch screen panel comprising a thin film transistor (TFT) array substrate comprising data signal lines and a plurality of pixel units arranged in a matrix; the TFT array substrate comprises touch driving signal lines located between adjacent rows of pixel units; at least one data signal line in the TFT array substrate acts as a touch reading signal line as well; the TFT array substrate comprises touch electrodes and touch switching units located in regions defined at overlapping positions between the touch reading signal lines and the touch driving signal lines; the touch electrodes are electrically connected with adjacent touch driving signal lines and electrically connected with adjacent touch reading signal lines via the touch switching units; in a display time period, the touch reading signal lines apply gray scale signals, and the touch switching units are in an off-state; in a touch time period, the touch driving signal lines apply touch driving signals, and the touch switching units are in an on-state, the touch driving signals are output to the touch reading signal lines after passing the touch electrodes.

Another aspect of the present invention provides a display device comprising the above-mentioned capacitive in-cell touch screen panel.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms such as "a," "an," "the" or the like are not intended to limit the amount, but indicate the existence of at lease one. The terms "comprises," "comprising," "includes," "including," and "contains", "containing" and the like are intended to specify that the elements or the objects stated before these terms encompass the elements or the objects and equivalents thereof listed after these terms, but do not preclude the other elements or objects. "On," "under," "right." "left" and the like are only used to indicate relative position relationships, and when the position of the object which is described is changed, the relative position relationship will be changed accordingly.

Thicknesses and shapes of various layers of films in the accompanying drawings do not reflect actual proportion of the TFT array substrate and are only used to illustrate contents of the present invention.

Figure 1:
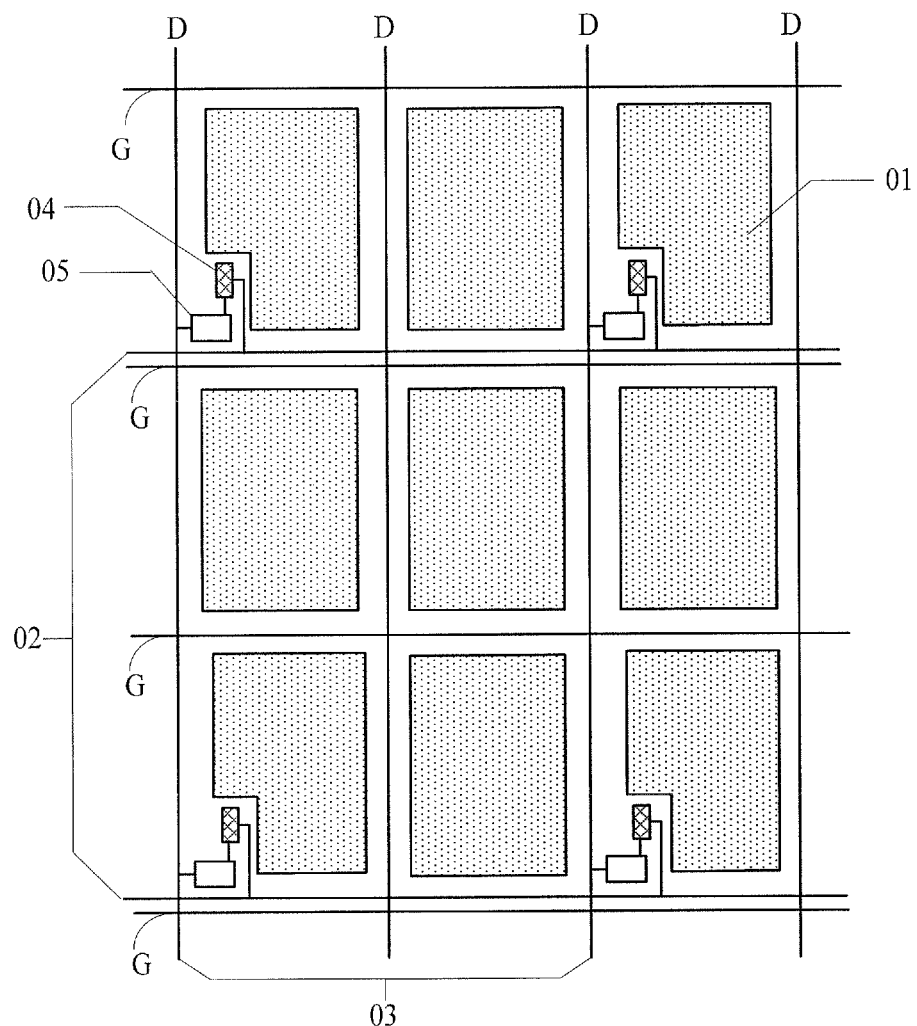
FIGS. 1 and 2 are structural views of a TFT array substrate in a capacitive in-cell touch screen panel provided in an embodiment of the present invention respectively.

An embodiment of the present invention provides a capacitive in-cell touch screen panel including a thin film transistor TFT array substrate comprising data signal lines D. As shown in FIG. 1, a plurality of pixel units 01 arranged in a matrix are disposed in the TFT array substrate; the TFT array substrate includes touch driving signal lines 02 between adjacent rows of pixel units; at least one data signal lines D in the TFT array substrate acts as a touch reading signal line 03; the TFT array substrate includes touch electrodes 04 and touch switching units 05 in regions defined at overlapping positions between touch reading signal lines 03 and touch driving signal lines 02; the touch electrodes 04 are electrically connected with the adjacent touch driving signal lines 02 and eclectically connected with the adjacent touch reading signal lines 03 via the touch switching units 05.

In a display time period, the touch switching units 05 are in an off-state, touch reading signal lines 03 are applied with gray scale signals; in a touch time period, touch switching units 05 are in an on-state, touch driving signal lines 02 are applied with touch driving signals that are output to touch reading signal lines 03 after passing touch electrodes 04.

For the above-mentioned capacitive in-cell touch screen panel provided in the embodiment of the present invention, because data signal lines are used in a time-division multiplexing manner as touch reading signal lines receiving voltage signals coupled by touch electrodes for implementing touch function, touch screen panels can be manufactured without adding a further process on the basis of the existing TFT array substrate preparation processes, which saves production costs and increases production efficiency. Further, using data signal lines as touch reading signal lines can avoid adding driving chips IC for individually controlling touch reading signal lines 03, which can save manufacturing costs.

Generally, touch precision of a touch screen panel is generally on the order of millimeters, while display precision of a TFT array substrate is generally on the order of microns. It can be seen that touch driving signal lines 02 and touch reading signal lines 03 required by the touch screen panel are much less than gate signal lines G and data signal lines D required by the TFT array substrate for display in amount. Therefore, in one example, the above-mentioned touch screen panel provided in the embodiment of the present invention can only set the spacing between adjacent touch driving signal lines 02 to be identical; or can only set the spacing between adjacent touch reading signal lines 03 to be identical; or can set the spacing between adjacent touch driving signal lines 02 to be identical and at the same time set the spacing between adjacent touch reading signal lines 03 to be identical as well. For example, with the instance shown in FIG. 1 as an example, touch driving signal lines 02 are spaced by two rows of pixel units 01 and touch reading signal lines 03 are spaced by two columns of pixel units 01. Preferably, in one example, it is possible to set the spacing between touch driving signal lines 02 and the spacing between touch reading signal lines 03 to be identical to unify touch precision of touch screen panels. The precision referred to in the embodiment of the present invention means the size of one touch electrode of the touch screen panel or the pixel electrode of the display screen.

Preferably, for the above-mentioned touch screen panel provided in the embodiment of the present invention, when providing the touch driving signal lines 02, the touch driving signal lines 02 may be provided on a same layer as and ensured to be insulated from the gate signal lines G in the TFT array substrate, that is, the touch driving signal lines 02 insulated from the gate signal lines G are formed while the gate signal lines G are forming. Thus, no additional manufacturing process is needed for manufacturing of the TFT array substrates, the patterns of the gate signal lines G and the touch driving signal lines 02 can be formed by one patterning process, which can save manufacturing costs and improve added value of products. Of course, it is also possible to manufacture the gate signal lines G and the touch driving signal lines 02 separately on different film layers, which is not limited here.

Figure 2:
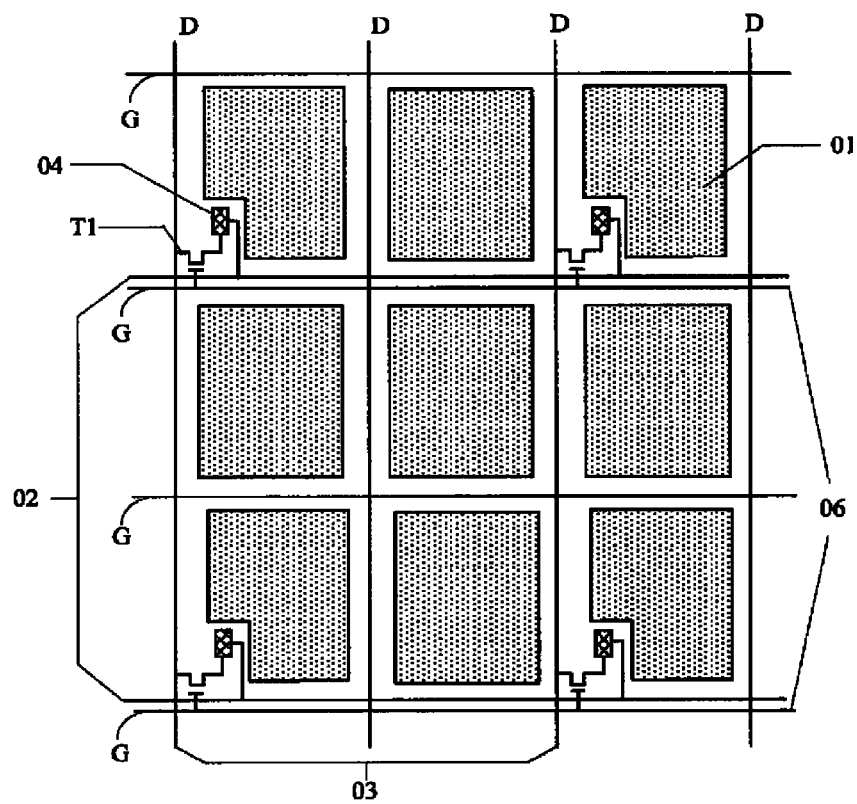

Furthermore, in one example of the above-mentioned touch screen panel provided in the embodiment of the present invention, as shown in FIG. 2, a specific implementation of the touch switching unit 05 is a first TFT device T1. A gate of the first TFT device T1 may be electrically connected with a touch scanning signal line 06, a drain may be electrically connected with a touch reading signal line 03, and a source may be electrically connected with a touch electrode 04.

For example, one implementation for touch scanning signal lines 06 may be that gate signal lines G in gaps between same pixel units 01 as touch driving signal lines 02 in the TFT array substrate are used as touch scanning signal lines 06. It is also possible to provide touch scanning signal lines 06 separately in the TFT array substrate. Touch scanning signal lines 06 are provided to control the on- or off-state of the touch switching units 05. In the touch time period, it is possible to locate the longitudinal coordinate, namely y direction coordinate of the touch point by sequentially applying touch scanning signals to touch scanning signal lines 06, and obtain the lateral coordinate, namely x direction coordinate of the touch point by detecting voltage signal variation on touch reading signal lines 03 column by column, thereby achieving touch function.

Furthermore, for example, it is also possible to omit touch scanning signal lines 06 and connect gates of the first TFT devices T1 with touch driving signal lines 02, thus touch driving signal lines 02 can function to control the on- or off-state of the touch switching units 05. In a similar way, in the touch time period, applying touch driving signals sequentially to the touch driving signal lines 02 can locate longitudinal coordinate, namely y direction coordinate of the touch point, and detecting voltage signal variation on touch reading signal lines 03 sequentially column by column can obtain lateral coordinate, namely x direction coordinate of the touch point, thereby achieving touch function.

The specific structure of the above-mentioned touch switching unit 05 is only for the illustrative purpose. Of course, the specific structure of the touch switching unit 05 may be of other structure, which is not limited here.

For example, the first TFT devices in the above-mentioned touch screen panel provided in the embodiment of the present invention may be formed by the same LTPS (low temperature polysilicon) technology as the second TFT devices for connecting pixel electrodes and data signal lines in the array substrate. Thus, the touch screen panel can be manufactured without adding any processing steps on the basis of existing manufacturing process of TFT array substrates, hence saving production costs and improving production efficiency.

Furthermore, for example, a first TFT device serving as a touch switching unit may constitute an inverter structure with a second TFT device for connecting a pixel electrode and a data signal line in the TFT array substrate. In particular, in the inverter structure, the first TFT device may be a P-type TFT device, and the second TFT device may be an N-type TFT device. Of course, it is also possible that the first TFT device is an N-type TFT device, and the second TFT device is a P-type TFT device, which is not limited here.

Hereinbelow, the specific operation process of the touch screen panel provided in the embodiment of the present invention will be described in detail with an example in which the first TFT device is a P-type TFT device and the second TFT device is an N-type TFT device.

Figure 3:
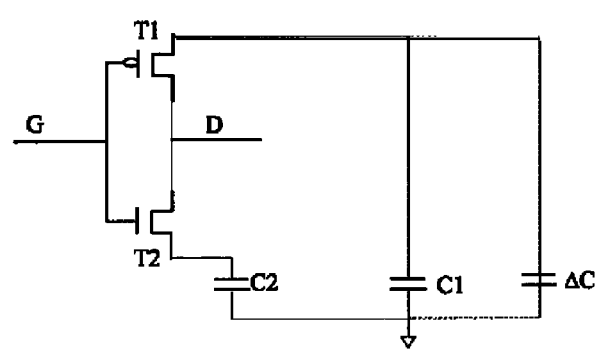
FIG. 3 is a schematic diagram of the circuit structure of one pixel unit provided in an embodiment of the present invention.

For example, in the circuit structure diagram of one pixel unit as shown in FIG. 3, a P-type first TFT device T1 and an N-type second TFT device T2 commonly use a gate signal line G as a touch scanning signal line and a data signal line D as a touch reading signal line.

Figure 4:
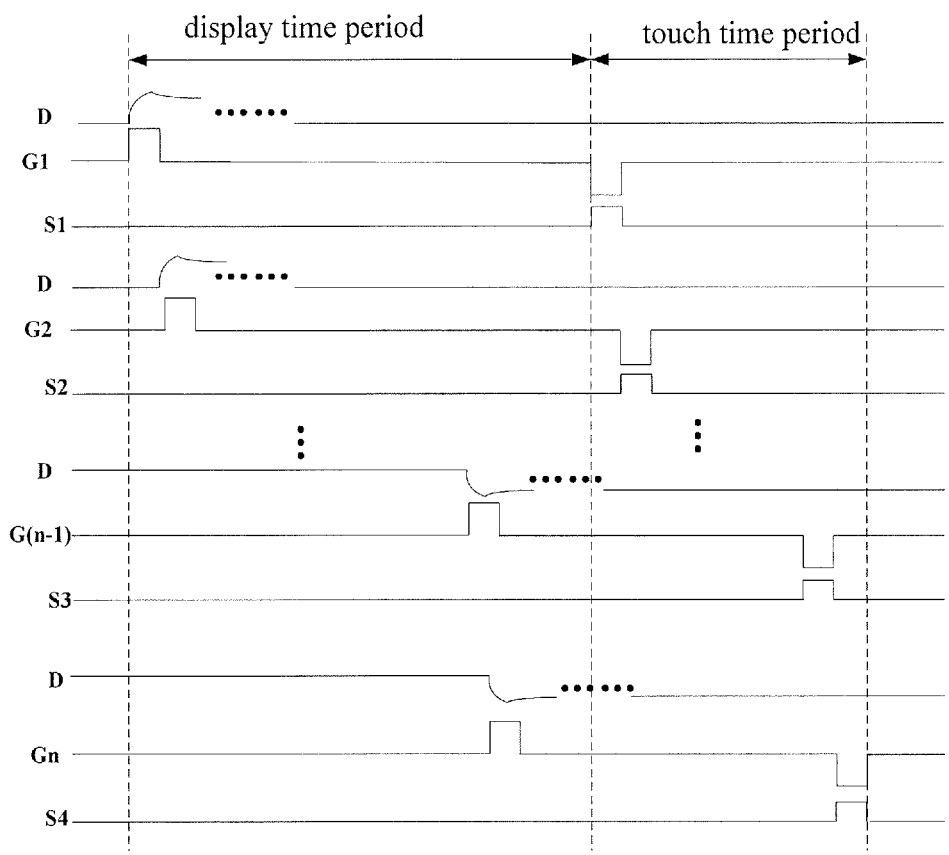
FIG. 4 is a timing sequence diagram for the touch screen panel provided in an embodiment of the present invention.

The example of driving timing sequence for the circuit structure shown in FIG. 3 is shown in FIG. 4 with detailed description below.

Firstly, the time for the touch screen panel to display every frame is divided into a display time period and a touch time period. For example, the period for the touch screen panel to display one frame is 16.7 ms, in which 5 ms is used as the touch time period and the remaining 11.7 ms as display time period. Of course it is possible to appropriately adjust durations of both depending on processing capacity of IC chips, which is not limited here.

In the display time period, the gate signal lines G1, G2 . . . Gn in the touch screen panel are each sequentially applied with display scanning signals at a high level (voltage signal of a positive value). According to the principle of an inverter, at this time the N-type second TFT device T2 is turned on and the P-type first TFT device T1 is in an off-state; and at the same time data signal lines D are applied with gray scale signals, and these gray scale signals are loaded to the display capacitors C2 via that N-type second TFT devices T2 for realizing normal display. A display capacitor C2 is formed of a pixel electrode and a common electrode. In this way, even if the touch electrodes carry voltage signals during the display stage, because the P-type first TFT devices T1 are in an off-state, voltage signals on touch capacitors C1 will not be output to data signal lines D, thereby will not interfere the normal display.

In the touch time period, the gate signal lines G1, G2, . . . Gn acting as touch scanning signal lines in the touch screen panel are each sequentially applied with a low level touch scanning signal (voltage signal with a negative value), and each of the touch driving signal lines S1, S2, . . . , Sn is applied with a touch driving signal that may be synchronous with the touch scanning signal. Of course, it is also possible to apply touch driving signals to each of the touch driving signal lines S1, S2, . . . , Sn at the same time, which is not limited here. The touch driving signals will be loaded to the touch electrodes connected therewith. According to the principle of an inverter, at this time the N-type second TFT device T2 is in an off-state and the P-type first TFT device T1 is turned on, and the touch driving signal is output to the touch reading signal line after being affected by the touch capacitor C1. The touch capacitor C1 is formed of a touch electrode and a common electrode. When a human body touches the touch screen panel, the human body capacitance ΔC will act on the touch capacitor C1 to cause change to the voltage signal on the touch electrode and in turn change the voltage signal received by the touch reading signal line. Detecting the voltage signal on the touch reading signal line sequentially column by column can obtain lateral coordinate, i.e., x direction coordinate of the touch point, while detecting touch scanning signals applied to touch scanning signal lines in order can obtain the longitudinal coordinate, i.e., y direction coordinate of the touch point, thereby obtaining the location of touch, realizing the touch function. In a specific implementation, it is possible to add one IC chip for controlling data signal lines on the basis of existing IC chip to detect output voltage signals, realizing the touch function.

As can be known from the above, by means of the principle of an inverter, applying different voltage signals to gate signal lines can individually select whether to turn on N-type TFT devices connected therewith or P-type TFT devices connected therewith, thereby achieving flexible switching between touch detection and display operation.

For example, with the above-mentioned touch screen panel provided in the embodiment of the present invention, for providing touch electrodes in regions defined at overlapping positions between the touch reading signal lines and the touch driving signal lines, metal or transparent conductive oxide may be used as the material for touch electrodes.

Preferably, in one example, every touch electrode may be disposed on a different layer from the pixel electrodes. In particular, it is possible to add one film layer and provide the touch electrodes above the pixel electrodes, however it is required to ensure that projections of touch electrodes onto the film layer where pixel electrodes are located has no overlapping parts with the pixel electrodes. Of course, if the material for touch electrodes is transparent conductive oxide, the touch electrodes may also be provided on the same layer as pixel electrodes in the TFT array substrate while it is ensured that they are insulated from each other.

Figure 5:
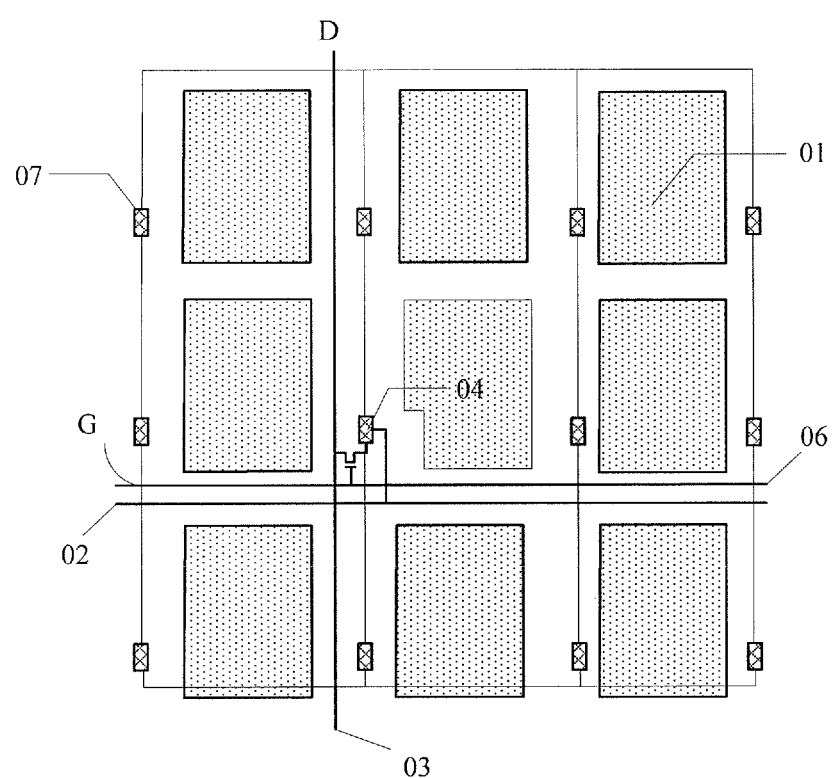
FIG. 5 is a distribution diagram of touch electrodes and touch sub-electrodes in the touch screen panel provided in an embodiment of the present invention.

When touch electrodes and pixel electrodes are provided on the same layer, since each touch electrode is disposed in a region defined at an overlapping portion between a touch reading signal line and a touch driving signal line, in order to guarantee the aperture ratio of the touch screen panel, the area of each touch electrode will be set small, which is disadvantageous for improving touch sensitivity. Therefore, preferably, as shown in FIG. 5, the above-mentioned touch screen panel provided in the embodiment of the present invention further includes at least one touch sub-electrode 07 electrically connected with the touch electrode 04 and located at gaps between adjacent pixel units 01. In this way, it is possible to increase the touch area of each touch electrode to a possible degree to improve sensitivity of touch sensing while guaranteeing the aperture ratio of the touch screen panel.

An embodiment of the present invention further provides a display device including any of the above-mentioned capacitive in-cell touch screen panels provided in the embodiment of the present invention, and this display device may be any product or unit with display function such as a mobile telephone, a flat computer, a television, a display, a notebook computer, a digital picture frame, and an navigator. The description for the implementations of the display device can be referred to the above-mentioned embodiment of the capacitive in-cell touch screen panel, and the description will not be repeated here anymore.

With the capacitive in-cell touch screen panel and the display device provided in the embodiments of the present invention, touch driving signal lines are disposed between adjacent rows of pixel units in the TFT array substrate; at least one data signal line in the TFT array substrate is used as touch reading signal lines; touch electrodes and touch switching units are disposed in regions defined at overlapping positions between the touch reading signal lines and the touch driving signal lines; the touch electrodes are electrically connected with the adjacent touch driving signal lines and electrically connected with the adjacent touch reading signal lines via the touch switching units. In the display time period, the touch reading signal lines are applied with gray scale signals, and the touch switching units are in an off-state; in the touch time period, the touch driving signal lines are applied with touch driving signals, the touch switching units are in an on-state, and the touch driving signals are output to the touch reading signal lines after passing the touch electrodes. Since the data signal lines are used in a time-division multiplexing manner as the touch reading signal lines for receiving voltage signals due to coupling of the touch electrodes for realizing touch function, a touch screen panel can be manufactured without adding a further process on existing manufacturing process for TFT array substrates, which saves production costs and improves production efficiency. Furthermore, using data signal lines as touch reading signal lines can avoid adding driving chip ICs for individually controlling touch reading signal lines so as to save manufacturing costs.

What are described above is related to the illustrative embodiments of the disclosure only and not limitative to the scope of the disclosure; the scopes of the disclosure are defined by the accompanying claims.

The invention claimed is:

1. A capacitive in-cell touch screen panel comprising a thin film transistor (TFT) array substrate comprising data signal lines and a plurality of pixel units arranged in a matrix, wherein
the TFT array substrate comprises touch driving signal lines located between adjacent rows of pixel units;
at least one data signal line in the TFT array substrate acts as a touch reading signal line as well;
the TFT array substrate comprises touch electrodes and touch switching units located in regions defined at overlapping positions between the touch reading signal lines and the touch driving signal lines; the touch electrodes are electrically connected with adjacent touch driving signal lines and electrically connected with adjacent touch reading signal lines via the touch switching units;
in a display time period, the touch reading signal lines apply gray scale signals, and the touch switching units are in an off-state; in a touch time period, the touch driving signal lines apply touch driving signals, and the touch switching units are in an on-state, and the touch driving signals are output to the touch reading signal lines after passing the touch electrodes;
the touch switching units constitute inverter structures with second TFT devices that connect pixel electrodes and the data signal lines in the TFT array substrate.

2. The capacitive in-cell touch screen panel of claim 1, wherein in the TFT array substrate, gate signal lines at gaps between same pixel units as the touch driving signal lines are used as touch scanning signal lines.

3. The capacitive in-cell touch screen panel of claim 2, wherein the touch switching units are first TFT devices;
wherein gates of the first TFT devices are electrically connected with the touch scanning signal lines, drains are electrically connected with the touch reading signal lines; sources are electrically connected with the touch electrodes.

4. The capacitive in-cell touch screen panel of claim 3, wherein the first TFT devices are P-type TFT devices, and the second TFT devices are N-type TFT devices.

5. The capacitive in-cell touch screen panel of claim 3, wherein spacing between the touch driving signal lines are identical; and/or spacing between the touch reading signal lines are identical.

6. The capacitive in-cell touch screen panel of claim 3, wherein the touch driving signal lines are disposed on a same layer as and are insulated from gate signal lines in the TFT array substrate.

7. The capacitive in-cell touch screen panel of claim 3, wherein a material for the touch electrodes is metal or transparent conductive oxide.

8. The capacitive in-cell touch screen panel of claim 7, wherein a material for the touch electrodes is transparent conductive oxide; the touch electrodes are disposed on a same layer as and insulated from pixel electrodes in the TFT array substrate.

9. The capacitive in-cell touch screen panel of claim 3, further comprising: at least one sub-electrode electrically connected with the touch electrode and located at a gaps between adjacent pixel units.

10. The capacitive in-cell touch screen panel of claim 2, wherein spacing between the touch driving signal lines are identical; and/or spacing between the touch reading signal lines are identical.

11. The capacitive in-cell touch screen panel of claim 2, wherein the touch driving signal lines are disposed on a same layer as and are insulated from gate signal lines in the TFT array substrate.

12. The capacitive in-cell touch screen panel of claim 2, wherein a material for the touch electrodes is metal or transparent conductive oxide.

13. The capacitive in-cell touch screen panel of claim 12, wherein a material for the touch electrodes is transparent conductive oxide; the touch electrodes are disposed on a same layer as and insulated from pixel electrodes in the TFT array substrate.

14. The capacitive in-cell touch screen panel of claim 2, further comprising: at least one sub-electrode electrically connected with the touch electrode and located at a gaps between adjacent pixel units.

15. The capacitive in-cell touch screen panel of claim 1, wherein spacing between the touch driving signal lines are identical; and/or spacing between the touch reading signal lines are identical.

16. The capacitive in-cell touch screen panel of claim 1, wherein the touch driving signal lines are disposed on a same layer as and are insulated from gate signal lines in the TFT array substrate.

17. The capacitive in-cell touch screen panel of claim 1, wherein a material for the touch electrodes is metal or transparent conductive oxide.

18. The capacitive in-cell touch screen panel of claim 17, wherein a material for the touch electrodes is transparent conductive oxide; the touch electrodes are disposed on a same layer as and insulated from pixel electrodes in the TFT array substrate.

19. The capacitive in-cell touch screen panel of claim 1, further comprising: at least one sub-electrode electrically connected with the touch electrode and located at a gaps between adjacent pixel units.

20. A display device comprising the capacitive in-cell touch screen panel according to claim 1.

* * * * *